United States Patent
Ho

(12) 
(10) Patent No.: US 7,175,143 B1
(45) Date of Patent: Feb. 13, 2007

(54) PORTABLE ACCESSORY HOOK

(76) Inventor: Trang Heather Ho, 1428 11th St., Suite 2, Santa Monica, CA (US) 90401

( * ) Notice: Subject to any disclaimer, the term of this patent is extended or adjusted under 35 U.S.C. 154(b) by 0 days.

(21) Appl. No.: 10/945,141

(22) Filed: Sep. 20, 2004

Related U.S. Application Data

(60) Provisional application No. 60/504,498, filed on Sep. 18, 2003.

(51) Int. Cl.
 *A47B 96/06* (2006.01)
 *A47K 1/00* (2006.01)

(52) U.S. Cl. ............... 248/215; 248/226.11; 248/227.1

(58) Field of Classification Search ............... 248/215, 248/229.12, 229.13, 229.22, 229.23, 227.1, 248/231.41, 231.51, 316.1, 316.4, 316.5, 248/317, 322, 339, 226, 22, 231.21, 229.24; 403/DIG. 1; 269/239, 249, 6
See application file for complete search history.

(56) References Cited

U.S. PATENT DOCUMENTS

| | | | | |
|---|---|---|---|---|
| 3,869,810 A | * | 3/1975 | Ronalds | 434/338 |
| 4,025,016 A | * | 5/1977 | Brothers | 248/210 |
| 4,541,155 A | * | 9/1985 | Gagnon | 24/486 |
| 4,901,964 A | * | 2/1990 | McConnell | 248/231.51 |
| 5,005,890 A | * | 4/1991 | Schwenger | 294/103.1 |
| 5,074,005 A | * | 12/1991 | Mach | 15/105 |
| 5,615,422 A | * | 4/1997 | Gravel | 4/579 |
| 5,934,139 A | * | 8/1999 | Tucker | 72/479 |
| 6,494,411 B1 | * | 12/2002 | Bjorklund | 248/49 |
| 6,536,911 B1 | * | 3/2003 | DiAngelo | 362/190 |
| 2003/0155478 A1 | * | 8/2003 | Easterling | 248/316.1 |
| 2003/0230326 A1 | * | 12/2003 | Lin | 135/20.1 |

* cited by examiner

*Primary Examiner*—Carl D. Friedman
*Assistant Examiner*—Tan Le
(74) *Attorney, Agent, or Firm*—Kenneth L Tolar

(57) ABSTRACT

A portable accessory hook includes a C-shaped clamp formed of a pair of jaws one of which is movable for tightly securing about a support surface. A J-shaped hook member is removably attachable to the clamp for retaining accessory items such as a purse or coat. The hook member may be rotated and angularly adjusted if desired.

10 Claims, 3 Drawing Sheets

PORTABLE ACCESSORY HOOK

CROSS REFERENCE TO RELATED APPLICATIONS

This application is entitled to the benefit of provisional application No. 60/504,498 filed on Sep. 18, 2003.

BACKGROUND OF THE INVENTION

The present invention relates to a portable accessory hook for temporarily securing items such as purses, hats or coats.

DESCRIPTION OF THE PRIOR ART

Securing accessory items in public establishments is always problematic. For example, women seated in a bar or restaurant must typically place their purses on the floor or hang them on a chair out of view subjecting them to theft or tampering. Furthermore, many public restrooms do not include coat hooks for temporarily retaining a coat while the wearer uses the facilities. The present invention satisfies these problems by providing a uniquely configured portable device that may be temporarily fastened to a door, tabletop or similar support surface to which a user can secure a purse, a coat or similar item.

SUMMARY OF THE INVENTION

The present invention relates to a portable accessory hook. The device comprises a substantially C-shaped clamp member formed of a lower movable jaw and an upper stationary jaw. The upper and lower jaws each include an axially aligned internally threaded bore that receives an elongated externally threaded shaft. A knob is attached to the top end of the shaft and is positioned on the upper surface of the fixed jaw. Rotation of the knob results in raising or lowering of the movable jaw to secure the jaws about a supporting surface such as a door or table top.

The lower movable jaw is L-shaped and includes a vertical rear portion. The vertical rear portion includes an open face. Positioned within the hollow portion of the lower jaw is a hook receiver. The hook receiver includes a pair of diametrically opposed octagonal apertures that align with octagonal apertures on opposing sides of the lower jaw. An octagonal rod is positioned within the aligned apertures to secure the receiver at a select angle. The rod includes a pair of detents that normally seat within depressions within the jaw to secure the rod within the aligned apertures. The bar may be pushed out of the apertures allowing the angular position of the receiver to be adjusted in 45° increments.

A J-shaped hook member is removably received within the receiver. The hook member includes an elongated stem having an upper end with a toothed collar positioned thereon. Between the collar and the elongated stem is an annular channel. Within the receiver are a pair of spring-biased latch members that seat within the channel to retain the hook member within the receiver. A release button on the exterior of the receiver may be depressed to separate the latch members allowing the hook member to be removed from the receiver.

To use the above described device, the jaws are placed about a supporting surface such as a door or table top. The knob is rotated until the jaws are tightly secured about the support surface. The J-shaped hook member is then inserted into the receiver until securely latched therein. An accessory item such as a coat or purse may then be draped about the hook member.

It is therefore an object of the present invention to provide a portable accessory hook that conveniently secures accessory items.

It is another object of the present invention to provide a portable accessory hook wherein the angle of the hook can be selectively varied.

It is yet another object of the present invention to provide a portable accessory hook that can be quickly and conveniently disassembled for transport or storage.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
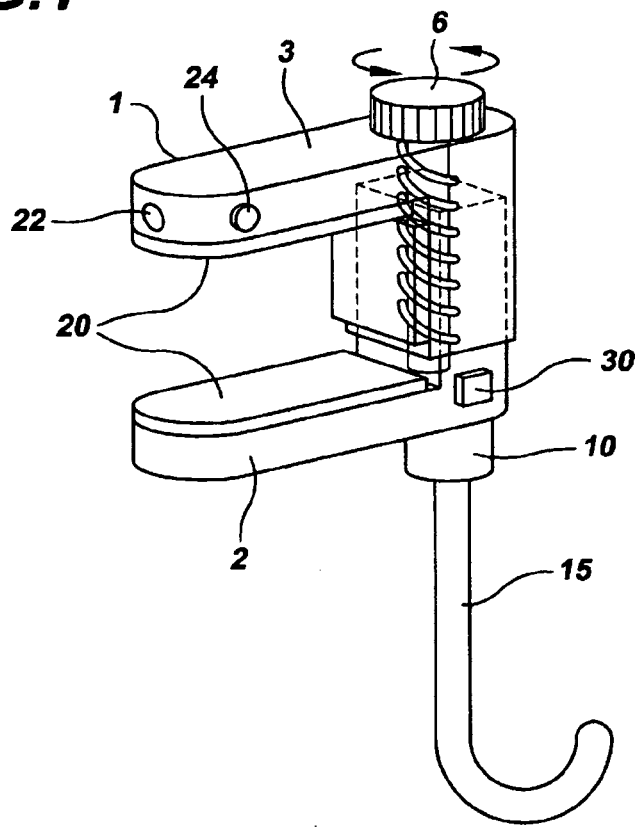
FIG. 1 is a perspective view of the portable hook.
Figure 2:
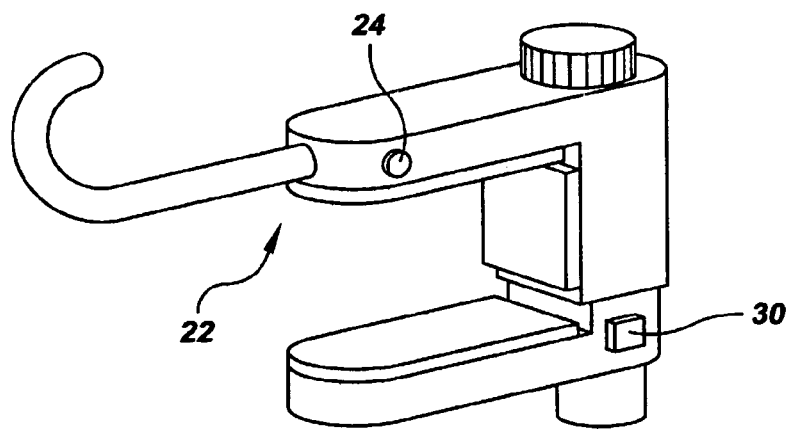
FIG. 2 is a perspective view of the portable hook with the hook member secured in a second location.
Figure 3:
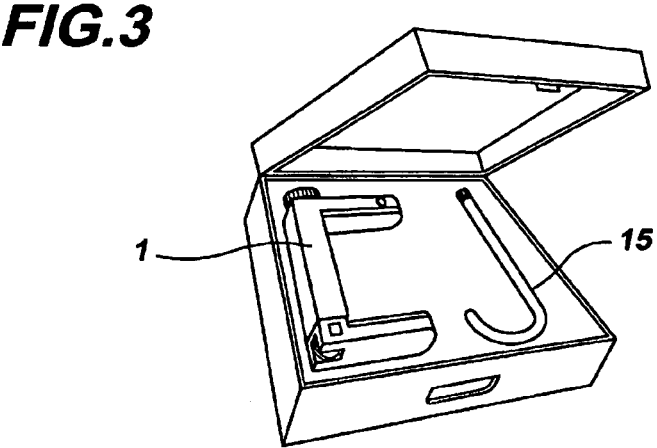
FIG. 3 depicts the portable hook disassembled and stored within an accompanying carrying case.
Figure 4:
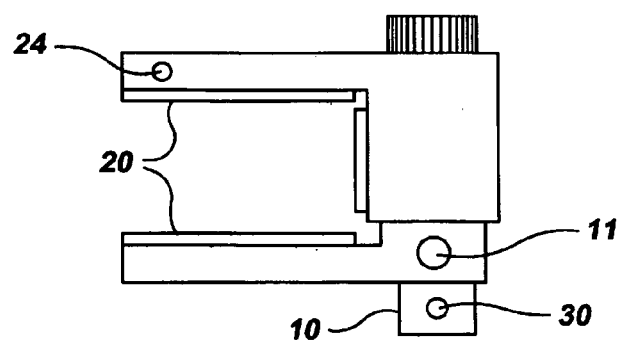
FIG. 4 is a plan view of the C-shaped clamp member.
Figure 5:
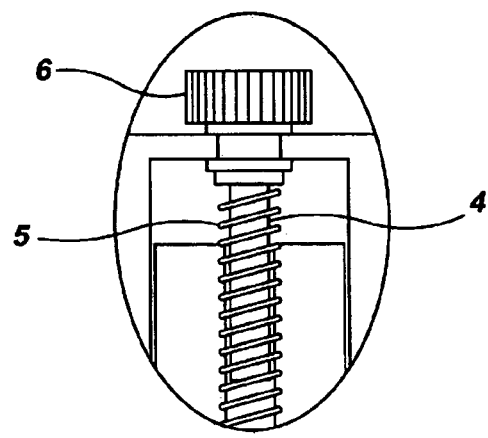
FIG. 5 is a cross-sectional view of the upper and lower jaws depicting the internally threaded bore and shaft received therein.
Figure 6:
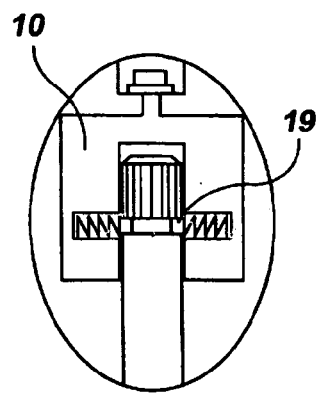
FIG. 6 is a detailed view of the spring biased latch mechanism.
Figure 7:
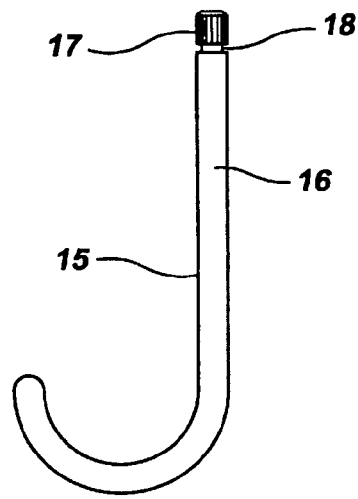
FIG. 7 is an isolated view of the hook member.
Figure 8:
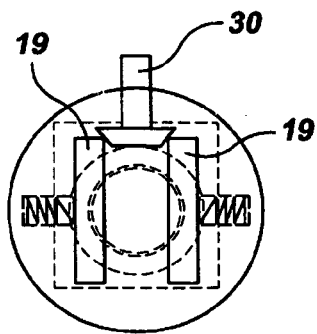
FIG. 8 is a top view of the spring-biased latch mechanism.
Figure 9:
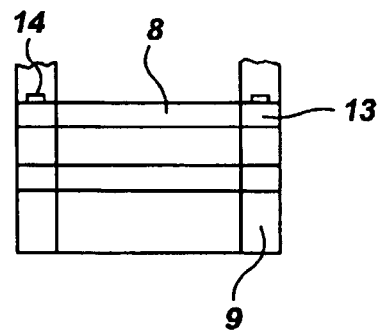
FIG. 9 is a rear, sectional view of the movable jaw.

The present invention relates to a portable accessory hook. The device comprises a substantially C-shaped clamp member 1 formed of a lower movable jaw 2 and an upper stationary jaw 3. Each jaw includes an inwardly facing surface 20 having a pad mounted thereon. The upper and lower jaws each include an axially aligned internally threaded bore 4 that receives an elongated externally threaded shaft 5. A knob 6 is attached to the top end of the shaft and is positioned on the upper surface of the fixed jaw. Rotation of the knob results in raising or lowering of the movable jaw to tighten the jaws about a supporting surface such as a door or tabletop.

The lower movable jaw is L-shaped and includes a vertical rear portion 8. The vertical rear portion includes an open face 9. Positioned within the hollow portion of the lower jaw is a hook receiver 10. The hook receiver includes a pair of diametrically opposed octagonal apertures that align with octagonal apertures 11 on opposing sides of the lower jaw. An octagonal rod 13 is normally positioned within the aligned apertures to secure the receiver at a select angle. The rod includes a pair of detents 14 that normally seat within depressions within the jaw to secure the rod within the aligned apertures. The bar may be pushed out of the apertures allowing the angular position of the receiver to be adjusted in 45° increments. The receiver is also rotatable relative to the fixed jaw.

A J-shaped hook member 15 is removably seated within the receiver. The hook member includes an elongated stem 16 having an upper end with a toothed collar 17 positioned thereon. Between the collar and the elongated stem is an annular channel 18. Within the receiver are a pair of spring-biased latch members 19 that seat within the channel to retain the hook member within the receiver. A release button 30 positioned on the exterior of the receiver may be depressed to separate the latch members allowing the hook member to be removed from the receiver.

As depicted in FIG. 1, a second fixed receptacle 22 for receiving the hook member is positioned on the terminal end of the upper fixed jaw. A second release button 24 is positioned adjacent thereto. The second receptacle is useful when the device is secured to vertical surfaces such as doors.

To use the above described device, the jaws are placed about a supporting surface such as a door or table top. The knob is rotated to close the jaws until they are tightly secured about the support surface. The J-shaped hook member is then inserted into either the adjustable receiver or fixed receptacle until securely latched therein. An accessory item such as a coat or purse may then be draped about the hook member.

The above described device is not limited to the exact details of construction and enumeration of parts provided herein. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A portable accessory hook comprising:
    a substantially C-shaped clamp member formed of a fixed jaw and a movable jaw spaced therefrom for gripping a support surface;
    a hook member removably attached to one of said jaws for retaining an accessory item;
    means for adjusting the angular orientation of said hook member relative to said one of said jaws, wherein said means for adjusting the angular orientation of said hook member includes a receiver pivotally attached to said movable jaw, said receiver receiving said hook member, a means for locking said receiver in a select angular orientation relative to said movable jaw;
    means for selectively varying a distance between said fixed jaw and said movable jaw allowing said clamp member to be secured to varying size support surfaces;
    means for releasably securing said hook member within said receiver.

2. The portable accessory hook according to claim 1 wherein said means for releasably securing said hook member within said receiver comprises:
    an annular channel formed on said hook member;
    a pair of spring-biased latch members positioned within said receiver, said latch members positioned within said channel to retain said hook member.

3. The portable accessory hook according to claim 1 wherein said means for selectively varying a distance between said fixed jaw and said movable jaw comprises:
    an axial, internally threaded bore formed within each of said jaws;
    an externally threaded shaft received with said bores whereby rotation of said shaft results in movement of said movable jaw relative to said fixed jaw.

4. The portable accessory hook according to claim 1 further comprising a receptacle on one of said jaws for selectively receiving said hook member.

5. The portable accessory hook according to claim 1 wherein said means for locking said receiver in a select angular orientation relative to said movable jaw comprises:
    said hook receiver having a pair of opposed apertures that are aligned with apertures on opposing sides of the lower jaw;
    a rod positioned within the aligned apertures to secure the receiver at a select angle;
    a pair of detents on the rod that seat within depressions within the lower jaw to secure the rod within the aligned apertures whereby the bar is removed from the apertures allowing the angular position of the receiver to be adjusted in predetermined increments.

6. A portable accessory hook comprising:
    a substantially C-shaped clamp member formed of a fixed jaw and a movable jaw spaced therefrom for gripping a support surface;
    a hook member removably attached to one of said jaws for retaining an accessory item;
    means for adjusting the angular orientation of said hook member relative to said one of said jaws wherein said means for adjusting the angular orientation of said hook member includes a receiver pivotally attached to said movable jaw, said receiver receiving said hook member, said hook receiver having a pair of opposed apertures that are aligned with apertures on opposing sides of the lower jaw; a rod positioned within the aligned apertures to secure the receiver at a select angle; a pair of detents on the rod that seat within depressions within the lower jaw to secure the rod within the aligned apertures whereby the bar is removed from the apertures allowing the angular position of the receiver to be adjusted in predetermined increments;
    means for selectively varying a distance between said fixed jaw and said movable jaw allowing said clamp member to be secured to varying size support surfaces.

7. A portable accessory book according to claim 6 wherein said means for selectively varying a distance between said fixed jaw and said movable jaw comprises an axial, internally threaded bore formed within each of said jaws;
    an externally threaded shaft received with said bores whereby rotation of said shaft results in movement of said movable jaw relative to said fixed jaw.

8. The portable accessory book according to claim 6 further comprising a receptacle on one of said jaws for selectively receiving said hook member.

9. The portable accessory hook according to claim 6 further comprising means for releasably securing said hook member within said receiver.

10. The portable accessory hook according to claim 9 wherein said means for releasably securing said book member within said receiver comprises:
    an annular channel formed on said hook member;
    a pair of spring biased latch members positioned within said receiver, said latch members positioned within said channel to retain said hook member.

* * * * *